US010263226B2

(12) United States Patent
Park et al.

(10) Patent No.: US 10,263,226 B2
(45) Date of Patent: Apr. 16, 2019

(54) BATTERY CELL HAVING ASYMMETRIC AND INDENTED STRUCTURE

(71) Applicant: LG CHEM, LTD., Seoul (KR)

(72) Inventors: Hyun Park, Daejeon (KR); Hyung Ku Yun, Daejeon (KR); In Gu An, Daejeon (KR); Eun Seok Choi, Daejeon (KR); Jin Woo Choi, Daejeon (KR); Yoo Jin An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 316 days.

(21) Appl. No.: 15/126,156

(22) PCT Filed: Nov. 7, 2014

(86) PCT No.: PCT/KR2014/010646
§ 371 (c)(1),
(2) Date: Sep. 14, 2016

(87) PCT Pub. No.: WO2015/141920
PCT Pub. Date: Sep. 24, 2015

(65) Prior Publication Data
US 2017/0092906 A1 Mar. 30, 2017

(30) Foreign Application Priority Data
Mar. 18, 2014 (KR) .................. 10-2014-0031432

(51) Int. Cl.
*H01M 2/06* (2006.01)
*H01M 2/02* (2006.01)
(Continued)

(52) U.S. Cl.
CPC .......... *H01M 2/06* (2013.01); *H01M 2/0207* (2013.01); *H01M 2/1022* (2013.01);
(Continued)

(58) Field of Classification Search
CPC .............. H01M 2/06; H01M 10/0525; H01M 10/0583; H01M 10/0585; H01M 10/0587;
(Continued)

(56) References Cited

U.S. PATENT DOCUMENTS

| 6,040,078 A * | 3/2000 | Fauteux | H01M 4/0442 |
| | | | 429/163 |
| 2010/0047685 A1* | 2/2010 | Lee | H01M 2/021 |
| | | | 429/176 |

(Continued)

FOREIGN PATENT DOCUMENTS

| KR | 20030066960 | * | 8/2003 |
| KR | 10-0440934 B1 | | 7/2004 |

(Continued)

OTHER PUBLICATIONS

KR20030066960 MT (Year: 2003).*

(Continued)

*Primary Examiner* — Alexander Usyatinsky
(74) *Attorney, Agent, or Firm* — Birch, Stewart, Kolasch & Birch, LLP (57) ABSTRACT

A battery cell configured to have a structure in which an electrode assembly, including a positive electrode, a negative electrode, and a separator interposed therebetween, is mounted in a battery case, the electrode assembly including two or more unit cells having different planar sizes, the unit cells being stacked in the height direction on the basis of a plane, at least one first unit cell selected from among the unit cells has an asymmetric structure formed on at least one side of the outer edge thereof on the basis of a middle axis crossing a main body of the first unit cell when viewed from above, and at least one second unit cell selected from among
(Continued)

the unit cells has an indented portion indented from at least one side of the second unit cell toward the middle of the second unit cell.

27 Claims, 8 Drawing Sheets

(51) Int. Cl.
| | | |
|---|---|---|
| *H01M 2/10* | (2006.01) | |
| *H01M 10/04* | (2006.01) | |
| *H01M 2/30* | (2006.01) | |
| *H01M 10/0525* | (2010.01) | |
| *H01M 10/0583* | (2010.01) | |
| *H01M 10/0585* | (2010.01) | |
| *H01M 10/0587* | (2010.01) | |
| *H01M 10/052* | (2010.01) | |
| *H01M 10/0562* | (2010.01) | |

(52) U.S. Cl.
CPC ....... *H01M 2/1061* (2013.01); *H01M 2/1072* (2013.01); *H01M 2/1077* (2013.01); *H01M 2/30* (2013.01); *H01M 10/0413* (2013.01); *H01M 10/0436* (2013.01); *H01M 10/0525* (2013.01); *H01M 10/0583* (2013.01); *H01M 10/0585* (2013.01); *H01M 10/0587* (2013.01); *H01M 10/052* (2013.01); *H01M 10/0562* (2013.01); *H01M 2002/0205* (2013.01); *H01M 2220/20* (2013.01); *H01M 2220/30* (2013.01)

(58) Field of Classification Search
CPC ........ H01M 2/10; H01M 2/30; H01M 2/0207; H01M 2/1072; H01M 10/0413; H01M 10/0436; H01M 2/1077; H01M 2/1022; H01M 2/1061; H01M 2220/20; H01M 10/052; H01M 10/0562; H01M 2002/0205; H01M 2220/30
See application file for complete search history.

(56) References Cited

U.S. PATENT DOCUMENTS

| | | | |
|---|---|---|---|
| 2011/0274955 A1* | 11/2011 | Park | H01M 2/0212 429/94 |
| 2013/0216880 A1* | 8/2013 | Park | H01M 2/0212 429/94 |
| 2014/0050959 A1 | 2/2014 | Ryu et al. | |
| 2014/0087224 A1* | 3/2014 | Kim | H01M 2/266 429/94 |
| 2014/0099525 A1 | 4/2014 | Kwon et al. | |
| 2014/0106206 A1 | 4/2014 | Kwon et al. | |
| 2015/0037664 A1 | 2/2015 | Kang et al. | |

FOREIGN PATENT DOCUMENTS

| | | |
|---|---|---|
| KR | 10-2013-0124622 A | 11/2013 |
| KR | 10-2013-0132342 A | 12/2013 |
| KR | 10-2013-0133639 A | 12/2013 |
| KR | 10-2013-0133659 A | 12/2013 |
| KR | 10-2013-0135017 A | 12/2013 |
| WO | WO 2011115464 * | 9/2011 |
| WO | WO 2013/168948 A1 | 11/2013 |

OTHER PUBLICATIONS

Decision to Grant a Patent for Application No. 2016557124 (Japanese counterpart of the instant Application) issued by JPO dated Apr. 5, 2018 (Year: 2018).*
Decision to grant at Patent for EP Application No. 14885986.1 (EP counterpart of the instant Application) dated Aug. 18, 2017 (Year: 2017).*
Notification to Grant a Patent for Application 201480077181 (Chinese counterpart of the instant Application) issued by SIPO on dated Dec. 8, 2018. (Year: 2018).*
International Search Report (PCT/ISA/210) issued in PCT/KR2014/010646, dated Feb. 6, 2015.
European Search Report for Appl. No. 14885986.1 dated Feb. 20, 2017.

* cited by examiner

BATTERY CELL HAVING ASYMMETRIC AND INDENTED STRUCTURE

TECHNICAL FIELD

The present invention relates to a battery cell having an asymmetric and indented structure.

BACKGROUND ART

With the remarkable development of information technology (IT), a great variety of portable information communication devices has been popularized. As a result, in the $21^{st}$ century, we are moving toward a ubiquitous society in which high-quality information service is possible regardless of time and place.

Secondary batteries are very important to realize such a ubiquitous society. Specifically, secondary batteries, which can be charged and discharged, have been widely used as an energy source for wireless mobile devices. In addition, lithium secondary batteries have also been used as an energy source for electric vehicles and hybrid electric vehicles, which have been proposed to solve problems, such as air pollution, caused by existing gasoline and diesel vehicles using fossil fuel.

As the range of devices to which secondary batteries are applicable has broadened, as described above, secondary batteries have also been diversified such that the secondary batteries can provide outputs and capacities suitable for devices to which the secondary batteries are applied. In addition, there is a strong need to reduce the size and weight of the secondary batteries.

Secondary batteries may be classified based on the shape of a battery case of each of the secondary batteries into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of a laminated aluminum sheet.

The electrode assembly mounted in the battery case functions as a power generating element, having a positive electrode/separator/negative electrode stack structure, which can be charged and discharged. The electrode assembly may be classified as a jelly-roll type electrode assembly configured to have a structure in which a long sheet type positive electrode and a long sheet type negative electrode, to which active materials are applied, are wound in the state in which a separator is disposed between the positive electrode and the negative electrode, a stacked type electrode assembly configured to have a structure in which a plurality of positive electrodes having a predetermined size and a plurality of negative electrodes having a predetermined size are sequentially stacked in the state in which separators are disposed respectively between the positive electrodes and the negative electrodes, or a stacked/folded type structure, which is a combination of the jelly-roll type electrode assembly and the stacked type electrode assembly.

In recent years, however, a new type of battery cell has been required in accordance with the trend toward a slim type design or various other designs. Specifically, there is a high necessity for a battery cell configured to have a structure in which the battery cell can be efficiently mounted in a device even in the case in which the device does not have sufficient space to receive the battery cell as the result of the reduction in size and thickness of the device.

Conventional devices are manufactured so as to have an approximately rectangular parallelepiped shape. In recent years, however, there have been developed devices having various external shapes. In the case in which a battery cell is configured to have a rectangular parallelepiped shape or a cylindrical shape, it is difficult to efficiently mount the battery cell in such devices having various external shapes.

For example, the sides of a smart phone may be curved to improve grip. However, in the case in which a battery cell having a rectangular parallelepiped shape or a battery pack having a rectangular parallelepiped shape is mounted in a device designed so as to have such curved portions, the efficiency of the efficiency of space utilization in the device may be lowered.

That is, the curved portions of the device have dead spaces, in which the battery cell cannot be mounted. Ultimately, such dead spaces lower the capacity of the device for a given volume.

In addition, heat is generated from the battery cell as the result of high performance of the device, and the lifespan of the battery cell may be considerably reduced due to the heat generated from the battery cell.

Therefore, there is a high necessity for a battery cell configured to have a structure in which the battery cell can be efficiently mounted in a device having various structures such that the amount of dead space is reduced, thereby maximizing the capacity of the battery cell, and in which the reduction in lifespan of the battery cell due to heat generated from the battery cell is prevented.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various spaces defined in a device, thereby maximizing the efficiency of space utilization in the device, and in which the battery cell can be efficiently mounted in devices having various external shapes in addition to a device having a rectangular structure.

It is another object of the present invention to provide a battery cell configured to have a structure that is capable of minimizing the reduction of lifespan of the battery cell due to heat generated during the operation of the battery cell while having the external shape described above.

Technical Solution

The above and other objects can be accomplished by the provision of a battery cell configured to have a structure in which an electrode assembly, including a positive electrode, a negative electrode, and a separator interposed between the positive electrode and the negative electrode, is mounted in a battery case, wherein the electrode assembly includes two or more unit cells having different planar sizes, the unit cells being stacked in the height direction on the basis of a plane, at least one unit cell (a) selected from among the unit cells has an asymmetric structure formed on at least one side of the outer edge thereof on the basis of a middle axis crossing a main body of the unit cell (a) when viewed from above, and at least one unit cell (b) selected from among the unit cells has an indented portion indented from at least one side of the unit cell (b) toward the middle of the unit cell (b).

That is, the battery cell according to the present invention includes two or more unit cells, and the unit cells have an indented portion and an asymmetric structure. Consequently, it is possible to manufacture battery cells having various capacities and sizes based on the specific structure described above. In addition, when manufacturing a device in which the battery cell is mounted, the battery cell may be efficiently mounted in various spaces defined in the device, thereby maximizing the efficiency of space utilization in the device.

In the present invention, the electrode assembly may be a plate-shaped electrode assembly configured to have a structure in which electrode terminals are located on one side of the electrode assembly, are located on opposite sides of the electrode assembly, or are located on one side and an adjacent side of the electrode assembly.

For example, the asymmetric structure of the unit cell (a) may include a curved portion.

The structure of the curved portion is not particularly restricted. The curved portion may have various structures as follows.

In one example, in the case in which the unit cell is configured to have an approximately rectangular shape when viewed from above, one corner of the unit cell may be curved.

In another example, in the case in which the outer edge of the unit cell has four sides when viewed from above, the curved portion may be formed at one of the four sides of the unit cell when viewed from above or may be formed over two or more of the four sides of the unit cell when viewed from above.

The curved portion may be configured to have an arc shape, and a convex part of the arc may constitute a portion of the outer surface of the unit cell (a). The curved portion may be formed such that the battery cell has a structure having the optimal volume and external shape based on the battery cell receiving structure of a device in which the battery cell is mounted. For example, the curved portion may be configured to have an arc shape having a radius equivalent to 10% to 300% of the long side of the unit cell (a).

In addition, the curved portion may be configured to have a shape having a plurality of arc centers. Alternatively, the curved portion may be configured to have a single arc shape having a single radius and a single arc center.

In addition, the curved portion may be formed at a region of the unit cell that does not contact another unit cell stacked on the unit cell in the state of being adjacent to the unit cell. That is, in the case in which unit cells having different planar sizes are stacked, a region at which the unit cells do not contact each other is provided between the unit cells. The curved portion may be formed at a region of one unit cell that does not contact another unit cell.

The shape of the indented portion is not particularly restricted. The indented portion may be configured to have various shapes. For example, the indented portion may be configured to have a polygonal shape when viewed from above. Specifically, the indented portion may be configured to have a rectangular shape. In addition, at least one side of the inside of the indented portion may be configured to have an arc shape when viewed from above. That is, the shape of the indented portion is not particularly restricted, and the indented portion may be configured to have various shapes, as long as the battery cell according to the present invention has a structure having the optimal volume and external shape based on the battery cell receiving structure of a device in which the battery cell is to be mounted.

In one example, the planar width of the indented portion may be 5% to 80% of the width of the unit cell (b). If the width of the indented portion is too small, the effects that can be achieved by forming the indented portion may not be expected. If the width of the indented portion is too large, on the other hand, the effect of improving the capacity of the battery cell as the result of including the unit cell (b) is insignificant. Furthermore, it is very inefficient in consideration of manufacturing cost and manufacturing efficiency.

As previously described, the electrode assembly includes two or more unit cells having different planar sizes. In a concrete example, the electrode assembly may include a first unit cell and a second unit cell, which are stacked in the state in which the first unit cell and the second unit cell are adjacent to each other, and the first unit cell and the second unit cell may have different planar lengths and/or widths. When the first unit cell and the second unit cell are stacked, therefore, a step may be formed due to the difference between the lengths or the widths of the first unit cell and the second unit cell in at least one direction when viewed from above.

Electrode terminals of the first unit cell and electrode terminals of the second unit cell may protrude in the same direction. In addition, the electrode terminals of the first unit cell and the electrode terminals of the second unit cell may be electrically connected to each other in the state in which the electrode terminals of the first unit cell and the electrode terminals of the second unit cell protrude so as to be stacked vertically.

In a concrete example, the electrode terminals may be formed at opposite sides of an indented portion formed at the first unit cell and at regions of the second unit cell corresponding to the opposite sides of the indented portion formed at the first unit cell when viewed from above.

In general, during charge and discharge of the battery cell, the greatest amount of heat is generated from the region of the battery cell at which the electrode terminals are located. The heat is conducted to the electrode assembly, with the result that electrode active materials may be deteriorated, whereby the lifespan of the battery cell may be reduced.

In the battery cell having the above structure, on the other hand, the vertical sectional area of the region of the main body of the electrode assembly at the region of the battery cell at which the electrode terminals are located is small as the result of providing the indented portion. As a result, the amount of heat introduced into the main body of the electrode assembly from the electrode terminals is minimized, whereby it is possible to minimize deterioration of the electrode active materials. In addition, since the region of the battery cell at which the electrode terminals are located protrudes from at least the first unit cell, a superior heat dissipation effect is also provided. As a result, the lifespan of the battery cell may be increased by minimizing thermal conduction and achieving the heat dissipation effect.

In the above structure, the width of each of the opposite sides of the indented portion may be 5% to 30% of the width of the first unit cell when viewed from above.

In a concrete example, a curved portion constituting the asymmetric structure may be formed at one side of the first unit cell or over two or more sides of the first unit cell when viewed from above, and the indented portion may be formed in one side of the second unit cell.

The width of the first unit cell may be greater than the width of the second unit cell. When the first unit cell and the second unit cell are stacked in the state in which the first unit cell and the second unit cell are adjacent to each other, therefore, a step may be formed due to the difference between the widths of the first unit cell and the second unit cell when viewed from side.

In addition, the radius of curvature of the curved portion of the first unit cell may be 50% to 200% of the difference between the width of the first unit cell and the width of the second unit cell.

Meanwhile, the first unit cell and the second unit cell may be stacked vertically such that at least one side of the first unit cell and at least one side of the second unit cell are adjacent to each other. At the sides of the unit cells that are vertically adjacent to each other, the electrode terminals of the unit cells may protrude so as to be stacked vertically such that the electrode terminals of the unit cells can be electrically connected to each other.

In the present invention, each of the unit cells may be configured to have a stacked type structure, a stacked/folded type structure, or a laminated/stacked type structure. Alternatively, a unit cell configured to have a combination of two or more selected from among the above structures may be mounted in a battery case. The details of the stacked/folded type unit cell are disclosed in Korean Patent Application Publication No. 2001-0082058, No. 2001-0082059, and No. 2001-0082060, which have been filed in the name of the applicant of the present patent application. The disclosures of the applications are incorporated herein by reference.

The inner surface of the battery case may be formed so as to correspond to the outer surface of the electrode assembly such that the volume of the battery cell, which is manufactured by receiving the electrode assembly in the battery case, is minimized. In addition, the outer surface of the battery case may be formed so as to correspond to the outer surface of the electrode assembly such that the volume of the battery cell is minimized.

The battery case may be made of a laminate sheet including a metal layer and a resin layer. Alternatively, the battery case may be a metal can.

The metal can type battery case may be made of a metal material, and may be configured to have a hollow structure. The pouch-shaped battery case may be made of a laminate sheet including a metal layer and a resin layer.

The laminate sheet may be configured to have a structure in which resin layers are applied to opposite surfaces of a metal blocking layer. For example, the laminate sheet may be configured to have a structure in which an outer resin layer exhibiting high durability is added to one major surface (the outer surface) of a metal blocking layer and a resin sealant layer exhibiting a good thermal bonding property is attached to the other major surface (the inner surface) of the metal blocking layer.

In a concrete example, the metal blocking layer may be made of aluminum, which exhibits a gas blocking property and ductility, thereby enabling the metal blocking layer to be manufactured in the form of a thin film or an aluminum alloy.

It is required for the outer resin layer to exhibit strong resistance to the external environment. Consequently, it is required for the outer resin layer to exhibit more than predetermined tensile strength and weather resistance. For this reason, the outer resin layer may be made of a polymer resin, such as polyethylene terephthalate (PET) or oriented nylon film.

The resin sealant layer may be made of cast polypropylene (CPP), which exhibits a high thermal welding property (thermal adhesive property) and a low hygroscopic property, which is necessary to restrain the permeation of an electrolyte, and is not expanded or is not corroded by the electrolyte.

In general, the metal can type battery case may be sealed by welding in the state in which one side or opposite sides, which are open for introduction of the electrode assembly, are covered using a cover(s). The pouch-shaped battery case may be sealed by thermally welding the outer edge of a receiving part.

The battery case made of the laminate sheet or the metal can type battery case may be provided with a receiving part in which the electrode assembly having the specific structure according to the present invention is mounted. The receiving part may be configured to have a step structure having a width and height corresponding to the shape of the electrode assembly having the specific structure according to the present invention.

For example, in the case in which the battery case is made of a laminate sheet, the battery case may include an upper case and a lower case. In this case, the upper case and the lower case may be provided with receiving parts corresponding to the external shape of the electrode assembly such that the upper case and the lower case are coupled to each other to receive the electrode assembly in a sealed space defined therebetween.

The battery cell may be a lithium ion battery cell or a lithium ion polymer battery cell. However, the present invention is not limited thereto.

In accordance with another aspect of the present invention, there is provided a device including the battery cell as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

In the following description, the structure of a battery cell will be described on the basis of unit cells that are received in a battery case for the convenience of description. The unit cells are received in the battery case, the outer shape of which is configured so as to correspond to the outer shape of a stack constituted by the unit cells, to manufacture a battery cell. Consequently, the battery cell is configured such that the outer shapes of the unit cells correspond to the outer shape of the battery cell.

Figure 1:
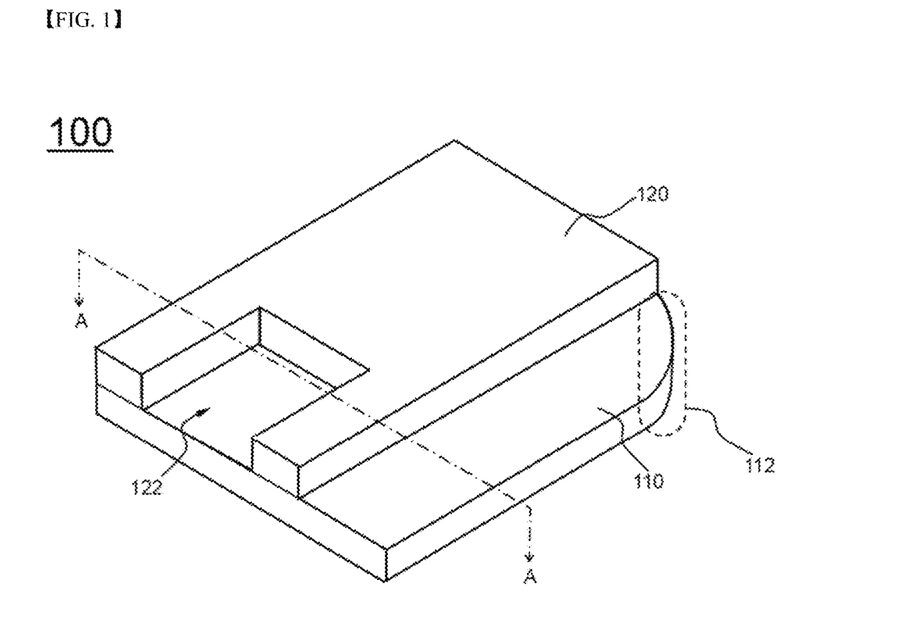
FIG. 1 is a perspective view showing a battery cell according to an embodiment of the present invention.
Figure 2:
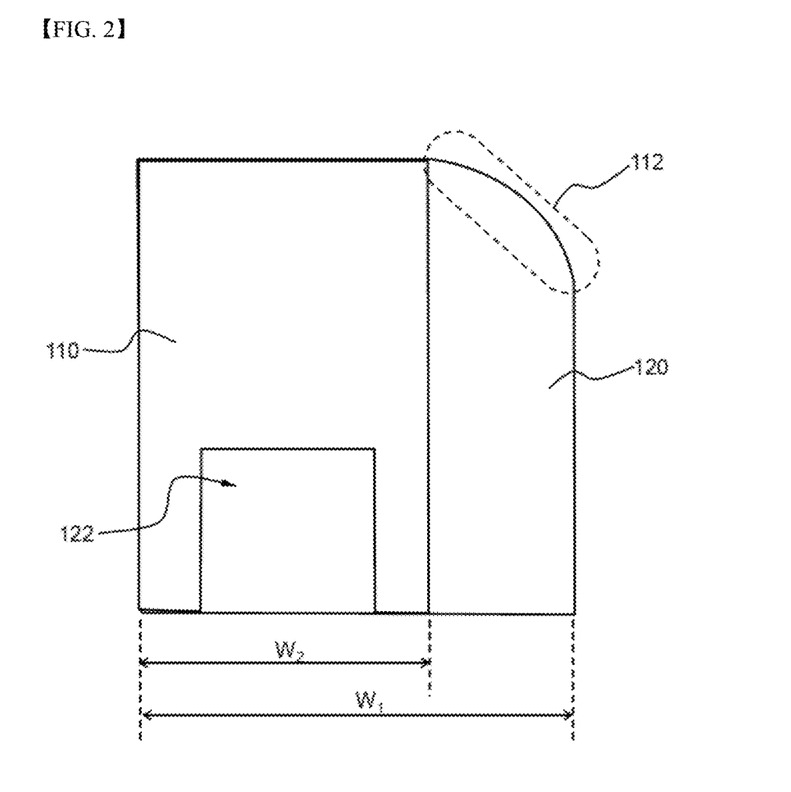
FIG. 2 is a plan view of FIG. 1.
Figure 3:
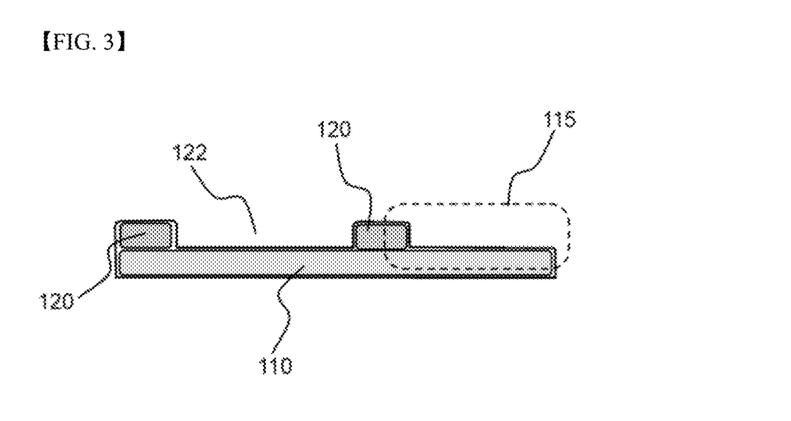
FIG. 3 is a vertical sectional view taken along line A-A of FIG. 1.

FIG. 1 is a perspective view typically showing a battery cell according to an embodiment of the present invention, FIG. 2 is a plan view of FIG. 1, and FIG. 3 is a vertical sectional view taken along line A-A of FIG. 1.

Referring to these figures, a battery cell 100 is configured to have a structure in which an electrode assembly is mounted in a battery case. The electrode assembly is configured to have a structure including two unit cells 110 and 120. The first unit cell 100 and the second unit cell 120 are stacked in the height direction, and have different planar sizes and shapes.

The first unit cell 110 is configured to have a symmetric planar structure in which a curved portion 112 is formed at one corner of the first unit cell 110, which is formed to have a rectangular shape. The curved portion 112 is configured to have an arc shape. The convex part of the arc constitutes a portion of the outer surface of the first unit cell 110. The curved portion 112 is formed at the region of the first unit cell 110 that does not contact the second unit cell 120, which is stacked on the first unit cell 110.

The second unit cell 120, which is stacked on the top surface of the first unit cell 110, is provided with an indented portion 122, which has an approximately rectangular parallelepiped shape. The indented portion 122 is indented from one side of the second unit cell 120 toward the middle of the second unit cell 120.

In addition, the width $W_1$ of the first unit cell 110 is greater than the width $W_2$ of the second unit cell 120 such that a step 115 is formed at one side of a stack constituted by the first unit cell 110 and the second unit cell 120.

That is, battery cells having various capacities and shapes may be manufactured using the unit cells 110 and 120, which have the curved portion 112 and the indented portion 122, respectively. In the case in which a battery cell mounting space in a device is inwardly concave or convex, therefore, the efficiency of the efficiency of space utilization in the device may be improved through the above-described structure, whereby the capacity of the battery cell is increased while the mounting stability of the battery cell is improved.

FIGS. 4 to 7 are plan views showing battery cells according to other embodiments of the present invention.

Figure 4:
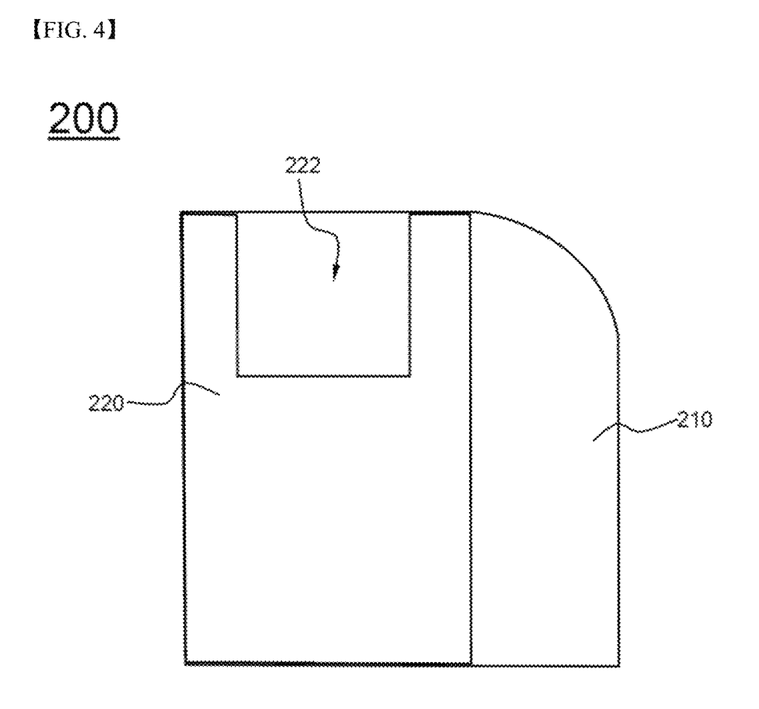
FIG. 4 is a plan view showing a battery cell according to another embodiment of the present invention.

Referring first to FIG. 4, a battery cell 200 is configured to have a structure in which an indented portion 222 of a second unit cell 220 is formed in a direction different from the direction in which the indented portion 122 of the second unit cell 120 shown in FIG. 1 is formed. That is, the direction in which the indented portion 222 of the second unit cell 220 is formed is not limited, but the indented portion 222 of the second unit cell 220 may be formed in various directions.

Figure 5:
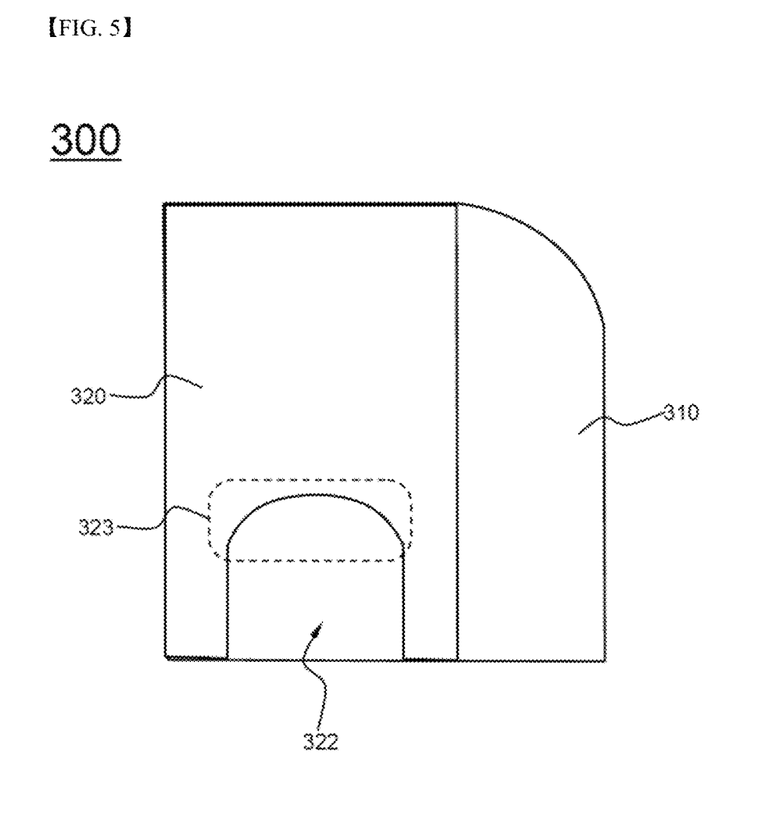
FIG. 5 is a plan view showing a battery cell according to another embodiment of the present invention.

Referring to FIG. 5, a battery cell 300 is configured to have a structure in which an indented portion 322 of a second unit cell 320 has a shape different from the shape of the indented portion 122 of the second unit cell 120 shown in FIG. 1. That is, the indented portion 122 of the second unit cell 120 shown in FIG. 1 has a planar rectangular shape, whereas a curved surface 323 is formed on the inside of the indented portion 322 of the second unit cell 320. That is, the indented portion 322 of the second unit cell 320 may be configured to have various structures, including a polygonal structure and an arc-shaped structure, in addition to the rectangular structure.

Figure 6:
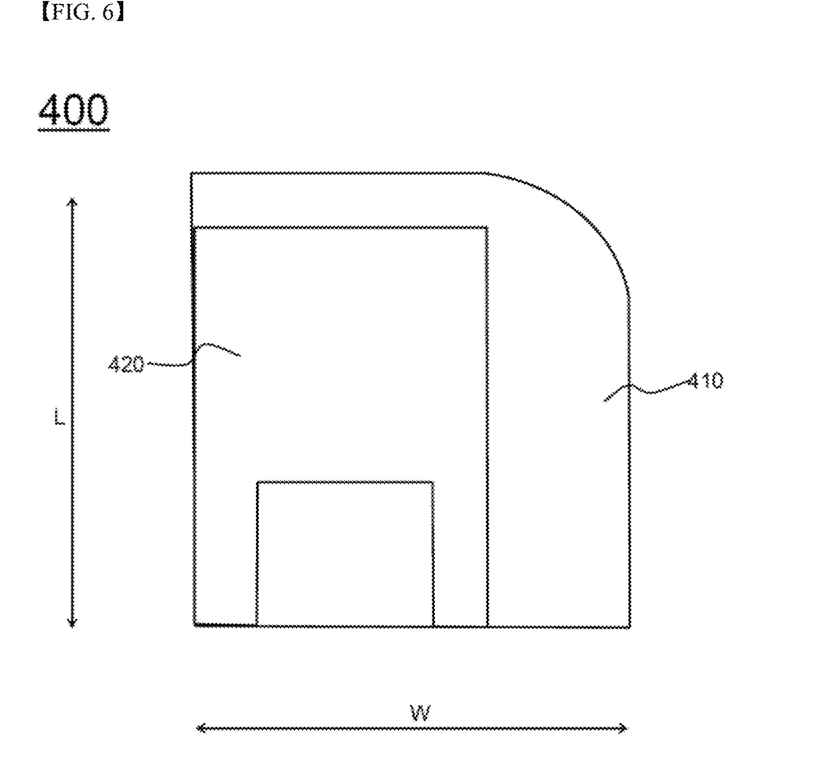
FIG. 6 is a plan view showing a battery cell according to another embodiment of the present invention.

Referring to FIG. 6, a battery cell 400 is configured to have a structure in which a second unit cell 420 has a smaller width W and length L than a first unit cell 410. As a result, the battery cell 400 is configured to have a structure in which a step is formed in the width W and length L directions when viewed in vertical section.

Figure 7:
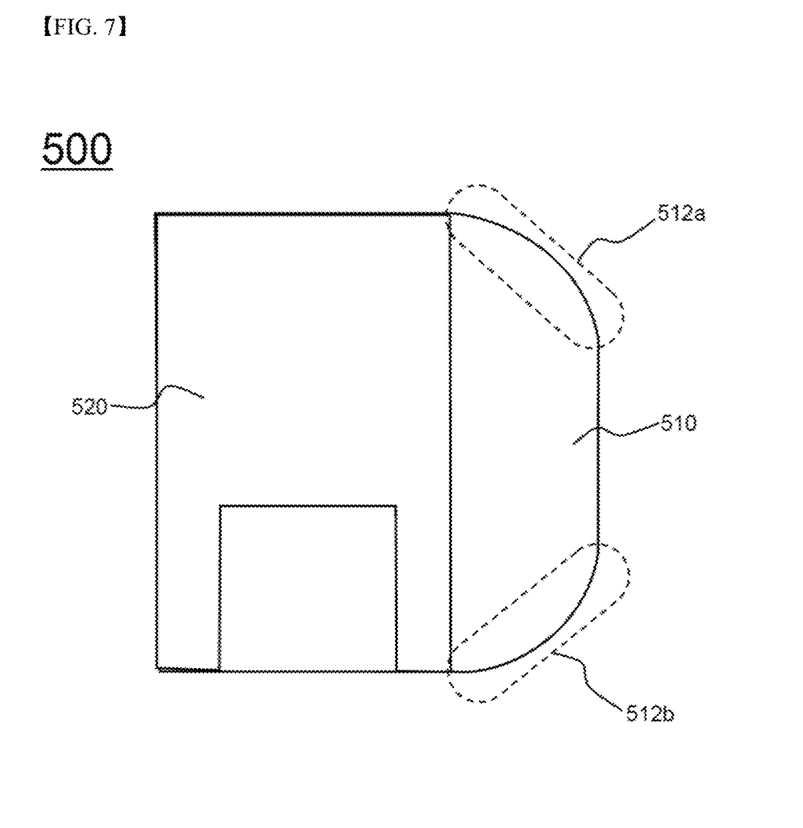
FIG. 7 is a plan view showing a battery cell according to another embodiment of the present invention.

Referring to FIG. 7, a battery cell 500 is configured to have a structure in which curved portions 512a and 512b are formed respectively at two corners of a first unit cell 510, which is different from the structure of the battery cell 100 shown in FIG. 1, in which the curved portion 112 is formed at one corner of the first unit cell 110. That is, the position, number, and shape of the curved portions are not limited.

Meanwhile, battery cells according to various embodiments of the present invention may each be manufactured to have a structure in which an electrode assembly is mounted in a battery case, such as a hollow metal container, in a sealed state. Alternatively, each battery cell may be manufactured as a pouch-shaped battery cell configured to have a structure in which an electrode assembly is mounted in a battery case made of a laminate sheet including a resin layer and a metal layer in the state in which the outer edge of the battery case is sealed by thermal bonding.

Figure 8:
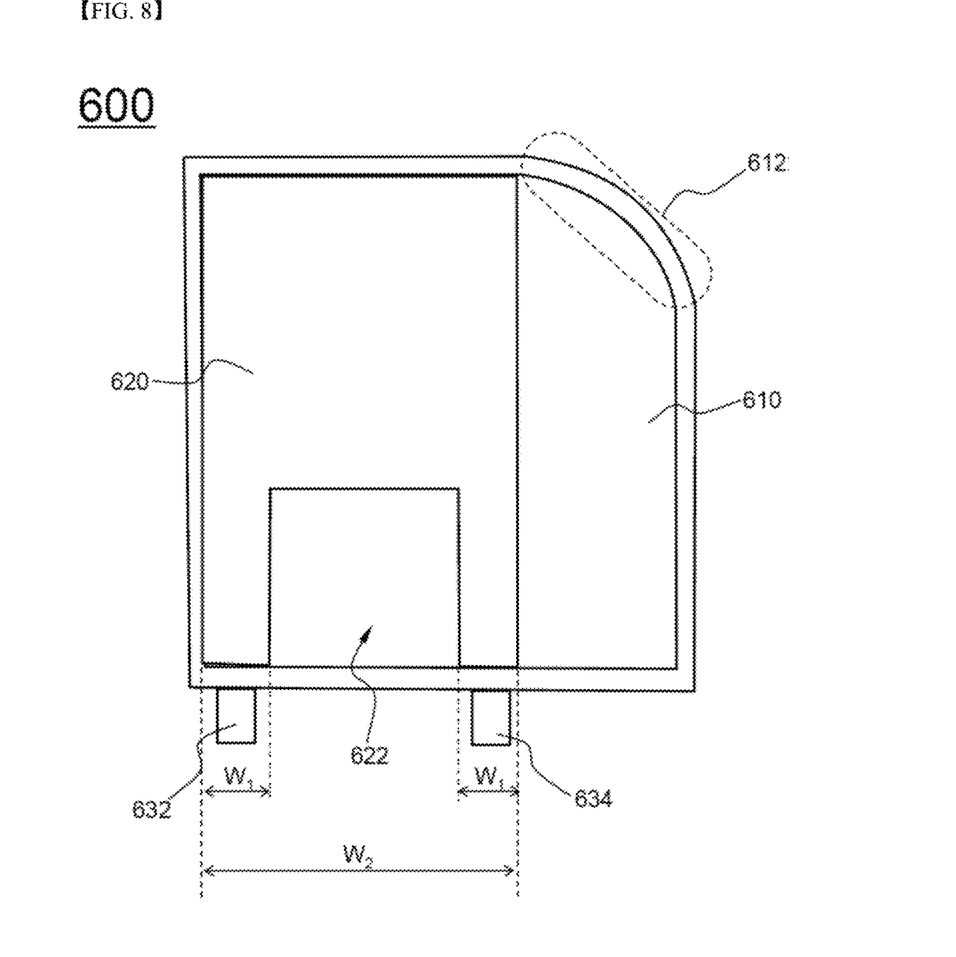
FIG. 8 is a plan view showing a battery cell according to another embodiment of the present invention.
Figure 9:
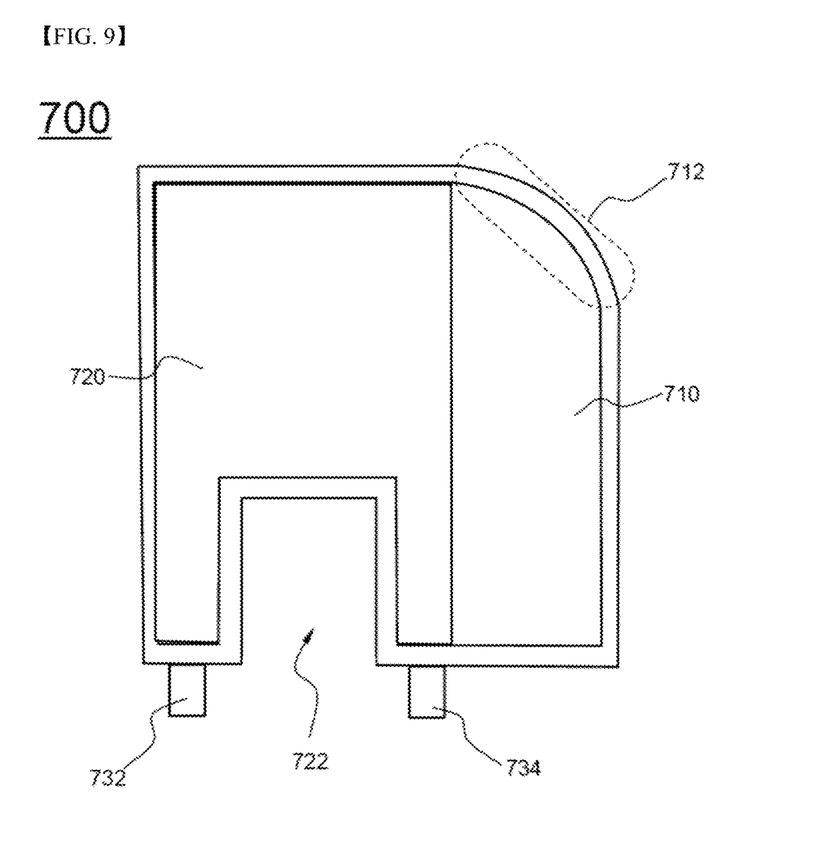
FIG. 9 is a plan view showing a battery cell according to a further embodiment of the present invention.

FIGS. 8 and 9 are plan views showing battery cells according to other embodiments of the present invention.

Referring to FIG. 8, a battery cell 600 is configured to have a structure in which the battery cell 100 shown in FIG. 1 is manufactured as a pouch-shaped battery cell. The pouch-shaped battery cell 600 is configured to have a structure in which a stack, including a first unit cell 610 having a curved portion 612 and a second unit cell 620 having an indented portion 622, the second unit cell 620 being stacked on the first unit cell 610, is mounted in a receiving part having a shape corresponding to the outer surface of the stack in a sealed state. In addition, when viewed from above, electrode terminals 632 and 634 are formed at opposite sides of the indented portion 622 of the second battery cell 620. The electrode terminals 632 and 634 protrude outward from the battery cell 600 such that the first unit cell 610 and the second unit cell 620 are connected to the outside in the state in which the first unit cell 610 and the second unit cell 620 are connected to each other in series or in parallel.

The width $W_1$ of each of the opposite sides of the indented portion 622, at which the electrode terminals 632 and 634 are formed, is 5% to 30% of the width $W_2$ of the second unit cell 620.

Referring to FIG. 9, a battery cell 700 is configured to have a structure in which the battery cell 100 shown in FIG. 1 is manufactured as a pouch-shaped battery cell. The pouch-shaped battery cell 700 is configured to have a structure in which a stack, including a first unit cell 710 having a curved portion 712 and an indented portion 722 and a second unit cell 720 having an indented portion 722, the second unit cell 720 being stacked on the first unit cell 710, is mounted in a receiving part having a shape corresponding to the outer surface of the stack in a sealed state. In addition, when viewed from above, electrode terminals 732 and 734 are formed at opposite sides of the indented portions 722. The electrode terminals 732 and 734 protrude outward from the battery cell 700 such that the first unit cell 710 and the second unit cell 720 are connected to the outside in the state in which the first unit cell 710 and the second unit cell 720 are connected to each other in series or in parallel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured to have a structure including unit cells having an indented portion and an asymmetric structure. Consequently, it is possible to manufacture battery cells having various capacities and sizes based on this specific structure. In addition, when manufacturing a device in which the battery cell is to be mounted, the battery cell may be efficiently mounted in various spaces defined in the device, thereby maximizing the efficiency of space utilization in the device. Furthermore, it is possible to minimize thermal conduction and to improve heat dissipation efficiency based on the positions of electrode terminals in addition to the specific structure, thereby increasing the lifespan of the battery cell.

The invention claimed is:

1. A battery cell configured to have a structure in which an electrode assembly, comprising a positive electrode, a negative electrode, and a separator interposed between the positive electrode and the negative electrode, is mounted in a battery case, wherein
the electrode assembly comprises two or more unit cells having different planar sizes, the unit cells being stacked in a height direction on a basis of a plane,
at least one first unit cell selected from among the unit cells has an asymmetric structure formed on at least one side of an outer edge thereof on a basis of a middle axis crossing a main body of the first unit cell when viewed from above, and
at least one second unit cell selected from among the unit cells has an indented portion, indented from at least one side of the second unit cell toward a middle of the second unit cell.

2. The battery cell according to claim 1, wherein the electrode assembly is a plate-shaped electrode assembly configured to have a structure in which electrode terminals are located at one side of the electrode assembly, or are located at opposite sides of the electrode assembly, or are located at one side and an adjacent side of the electrode assembly.

3. The battery cell according to claim 1, wherein the asymmetric structure comprises a curved portion.

4. The battery cell according to claim 3, wherein the curved portion is formed at one selected from among four sides of the at least one first unit cell when viewed from above or is formed over two or more of the four sides of the at least one first unit cell when viewed from above.

5. The battery cell according to claim 3, wherein the curved portion is configured to have an arc shape, and a convex part of the arc constitutes a portion of an outer surface of the at least one first unit cell.

6. The battery cell according to claim 5, wherein the curved portion is configured to have an arc shape having a radius equivalent to 10% to 300% of a long side of the at least one first unit cell.

7. The battery cell according to claim 5, wherein the curved portion is configured to have a single arc shape having a single radius and a single arc center.

8. The battery cell according to claim 3, wherein the curved portion is formed at a region of the at least one first unit cell that does not contact another unit cell stacked on the at least one first unit cell in a state of being adjacent to the at least one first unit cell.

9. The battery cell according to claim 1, wherein the indented portion is configured to have a polygonal shape when viewed from above.

10. The battery cell according to claim 9, wherein the indented portion is configured to have a rectangular shape when viewed from above.

11. The battery cell according to claim 1, wherein at least one side of an inside of the indented portion is configured to have an arc shape when viewed from above.

12. The battery cell according to claim 1, wherein a planar width of the indented portion is 5% to 80% of a width of the at least one second unit cell.

13. The battery cell according to claim 1, wherein the at least one first unit cell and the at least one second unit cell have different planar lengths and/or widths.

14. The battery cell according to claim 13, wherein electrode terminals of the at least one first unit cell and electrode terminals of the at least one second unit cell protrude in the same direction.

15. The battery cell according to claim 14, wherein the electrode terminals of the at least one first unit cell and the electrode terminals of the at least one second unit cell are electrically connected to each other in a state in which the electrode terminals of the at least one first unit cell and the electrode terminals of the at least one second unit cell protrude are stacked vertically.

16. The battery cell according to claim 14, wherein the electrode terminals are formed at opposite sides of an indented portion formed at the at least one second unit cell and at regions of the at least one first unit cell corresponding to the opposite sides of the indented portion formed at the at least one second unit cell.

17. The battery cell according to claim 16, wherein a width of each of the opposite sides of the indented portion is 5% to 30% of a width of the at least one second unit cell.

18. The battery cell according to claim 13, wherein a curved portion constituting the asymmetric structure is formed at one side of the at least one first unit cell or over two or more sides of the at least one first unit cell when viewed from above, and the indented portion is formed in one side of the at least one second unit cell.

19. The battery cell according to claim 18, wherein a width of the at least one first unit cell is greater than a width of the at least one second unit cell.

20. The battery cell according to claim 19, wherein a radius of curvature of the curved portion of the at least one first unit cell is 50% to 200% of a difference between the width of the at least one first unit cell and the width of the at least one second unit cell.

21. The battery cell according to claim 18, wherein the at least one first unit cell and the at least one second unit cell are stacked vertically such that at least one side of the at least one first unit cell and at least one side of the at least one second unit cell are adjacent to each other.

22. The battery cell according to claim 1, wherein each of the unit cells is a stacked type, a stacked/folded type, or a jelly-roll type electrode group.

23. The battery cell according to claim 1, wherein an inner surface of the battery case is formed so as to correspond to an outer surface of the electrode assembly.

24. The battery cell according to claim 1, wherein the battery case is made of a laminate sheet comprising a metal layer and a resin layer.

25. The battery cell according to claim 1, wherein the battery cell is a lithium ion battery cell.

26. A device comprising the battery cell according to claim 1 as a power source.

27. The device according to claim 26, wherein the device is selected from a group including a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

* * * * *